US012811521B2

(12) United States Patent
Tzeng

(10) Patent No.: US 12,811,521 B2
(45) Date of Patent: Nov. 24, 2026

(54) MOTOR UNIT AND MOTOR CONTROLLER THEREOF

(71) Applicant: Global Mixed-mode Technology Inc., Hsin-Chu (TW)

(72) Inventor: Guang-Nan Tzeng, Hsinchu City (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 168 days.

(21) Appl. No.: 18/434,838

(22) Filed: Feb. 7, 2024

(65) Prior Publication Data

US 2025/0253780 A1 Aug. 7, 2025

(51) Int. Cl.
*H02P 6/15* (2016.01)

(52) U.S. Cl.
CPC .................................... *H02P 6/153* (2016.02)

(58) Field of Classification Search
USPC .................................................... 318/400.14
See application file for complete search history.

(56) References Cited

U.S. PATENT DOCUMENTS 5,168,181 A * 12/1992 Baiocchi .............. H03K 5/1252 326/26
11,362,607 B1 * 6/2022 Tzeng ..................... F04D 25/06
2012/0242264 A1 * 9/2012 Satake ...................... H02P 6/26 318/400.06
2015/0256328 A1 * 9/2015 Kamatani ............ G01D 5/2448 375/226
2022/0077796 A1 * 3/2022 Lee ........................... H02P 6/08
2022/0337180 A1 10/2022 Jerichow

FOREIGN PATENT DOCUMENTS

JP 7314401 7/2023
TW 202245401 A 11/2022
TW I794805 B 3/2023
WO 2021/161650 A1 8/2021

* cited by examiner

*Primary Examiner* — Gabriel Agared
(74) *Attorney, Agent, or Firm* — Winston Hsu

(57) ABSTRACT

A motor unit comprises a motor controller and a motor. The motor controller comprises a switch circuit, a control circuit, and a phase signal generating circuit. The phase signal generating circuit receives an input phase signal so as to generate an output phase signal to the control circuit. Firstly the control circuit enables the output phase signal to maintain a first digital level to drive the motor during a first time duration, such that a rotor escapes from a dead zone. Then the control circuit enables the output phase signal to maintain a second digital level to drive the motor during a second time duration, such that the rotor escapes from the dead zone. The motor unit and the motor controller are capable of switching phases smoothly.

13 Claims, 4 Drawing Sheets

MOTOR UNIT AND MOTOR CONTROLLER THEREOF

BACKGROUND OF THE INVENTION

1. Field of the Invention

The present invention relates to a motor unit, and more particularly, to a single-phase motor unit.

2. Description of the Prior Art

Conventionally, there are two driving methods for driving a motor. The first driving method uses the Hall sensor for switching phases, so as to drive the motor. The second driving method does not use the Hall sensor to drive the motor. When a single-phase motor system installs a Hall sensor and an asymmetrical silicon steel plate, the asymmetrical structure results in noise issue because the single-phase motor system is incapable of switching phases smoothly. Thus, a new technology is needed to overcome the issue.

SUMMARY OF THE INVENTION

According to the present invention, a motor unit which is capable of switching phase smoothly is provided. The motor unit comprises a motor controller, a motor, a comparator, and a Hall sensor, where the motor controller is used for driving the motor. A fan comprises the motor, a fan blade, and the Hall sensor. The motor comprises a rotor, a silicon steel plate, and a coil, where the motor is a single-phase motor. The rotor is divided into two north magnetic poles N and two south magnetic poles S to switch motor phases. An interface between the north magnetic pole N and the south magnetic pole S is located in a position with respect to a zero position of a mechanism in a still state. The Hall sensor is installed in a position with respect to the zero position of the mechanism.

The motor controller comprises a switch circuit, a control circuit, and a phase signal generating circuit. The Hall sensor detects a position of the rotor and generates a first voltage signal and a second voltage signal. The comparator generates an input phase signal based on the first voltage signal and the second voltage signal. The switch circuit is configured to supply a motor current to the motor. The control circuit generates a plurality of control signals to control the switch circuit. The phase signal generating circuit receives the input phase signal, so as to generate an output phase signal to the control circuit. The control circuit switches motor phases according to the output phase signal. The control circuit firstly enables the output phase signal to maintain a first digital level to drive the motor during a first time duration, such that the rotor escapes from a dead zone. Then the control circuit enables the output phase signal to maintain a second digital level to drive the motor during a second time duration, such that the rotor escapes from the dead zone. The first time duration may be adjacent to the second time duration. The first digital level may be different from the second digital level. The motor may further comprise a first terminal and a second terminal. The first terminal has a first signal and the second terminal has a second signal. A waveform of the first signal may be synchronous and inverted to a waveform of the output phase signal. A waveform of the second signal may be synchronous and the same to a waveform of the output phase signal.

According to one embodiment of the present invention, the control circuit stores an initial level of the input phase signal. The first digital level may be inverted to the initial level.

According to another embodiment of the present invention, the control circuit stores an initial level of the input phase signal. The first digital level may be the same to the initial level.

The control circuit may enable the output phase signal to be asynchronous to the input phase signal during the first time duration and the second time duration. After a time point, the control circuit may enable a waveform of the output phase signal to be synchronous and the same to a waveform of the input phase signal. Before the time point, the control circuit may enable a waveform of the output phase signal to be asynchronous to a waveform of the input phase signal. The motor unit and the motor controller may enable the rotor to at least escape from the dead zone twice or more to operate in a start-up mode. Moreover, the motor unit and the motor controller may enable the rotor to at least escape from the dead zone twice or more to execute a forward and reverse rotation function.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
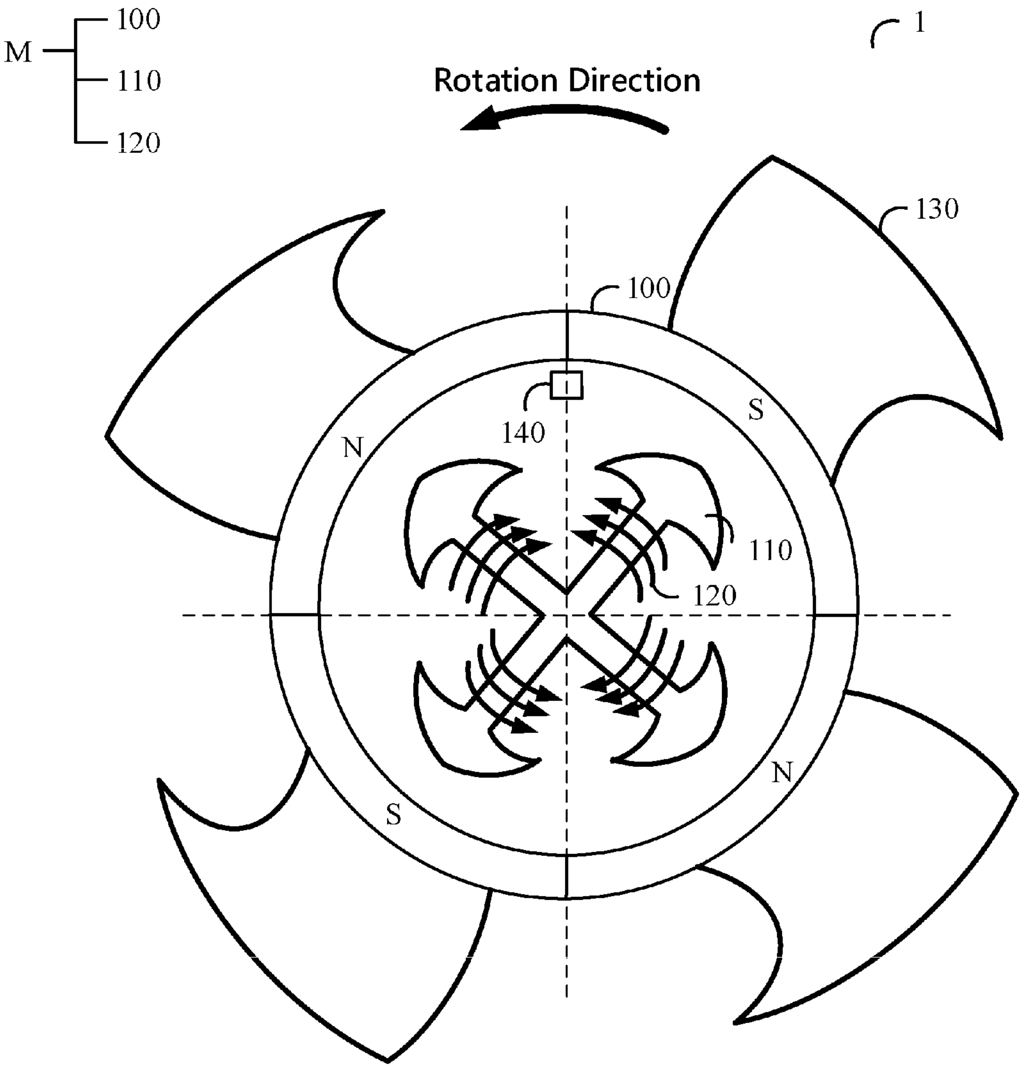
FIG. 1 is a schematic diagram showing a fan according to one embodiment of the present invention.

FIG. 1 is a schematic diagram showing a fan 1 according to one embodiment of the present invention. The fan 1 comprises a motor M, a fan blade 130, and a Hall sensor 140, where a dashed line indicates a zero position of a mechanism. The motor M comprises a rotor 100, a silicon steel plate 110, and a coil 120, where the motor M may be a single-phase motor. The rotor 100 may be divided into two north magnetic poles N and two south magnetic poles S to switch motor phases. According to one embodiment of the present invention, the rotor 100 may be divided into 2M north magnetic poles N and 2M south magnetic poles S to switch motor phases, where M is a positive integer and M is equal to or greater than 1. The coil 120 surrounds the silicon steel plate 110 for driving the rotor 100 based on the magnetic induction resulting in the variation of the magnetic field. The silicon steel plate 110 may have a symmetrical structure. The symmetrical structure may result that an interface between the north magnetic pole N and the south magnetic pole S is located in a position with respect to the zero position of the mechanism in a still state. Furthermore, the Hall sensor 140 may be installed in a position with respect to the zero position of the mechanism.

Figure 2:
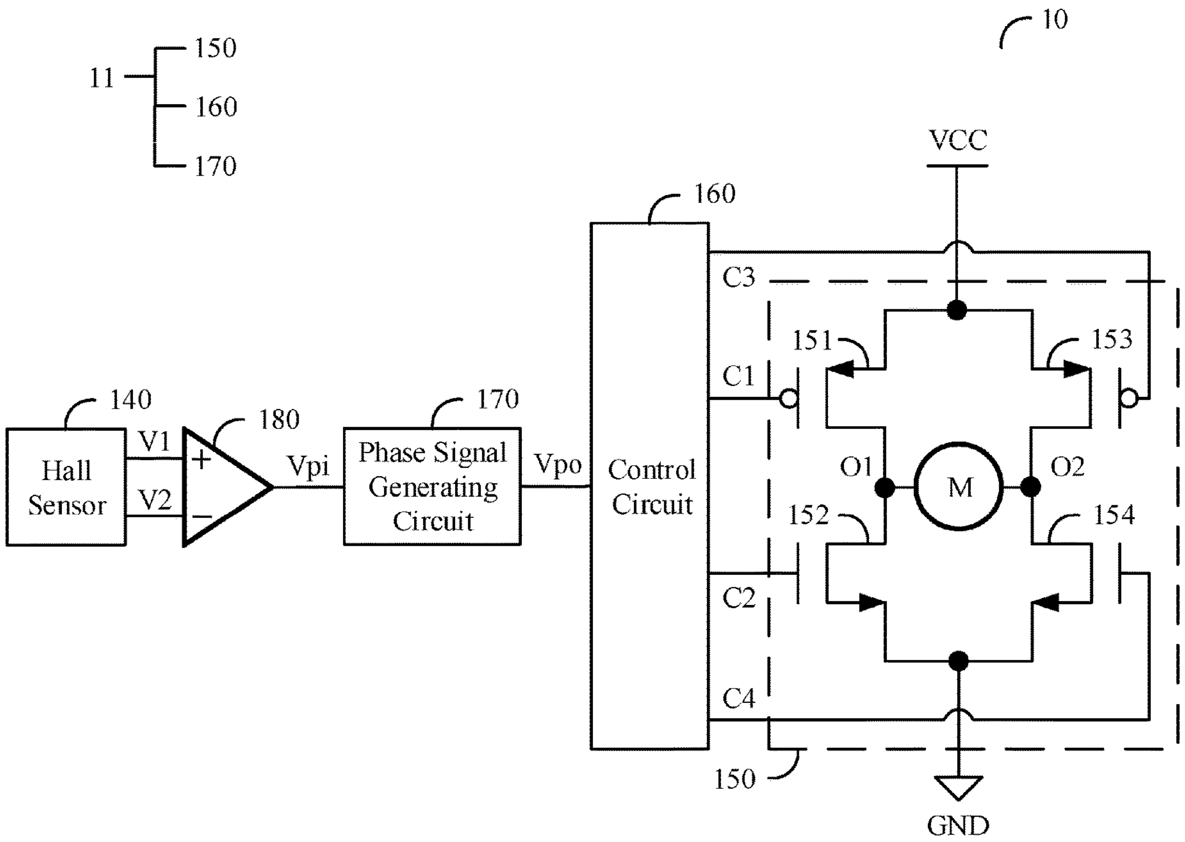
FIG. 2 is a schematic diagram showing a motor unit according to one embodiment of the present invention.

FIG. 2 is a schematic diagram showing a motor unit 10 according to one embodiment of the present invention. The motor unit 10 comprises a motor controller 11, the motor M, a comparator 180, and the Hall sensor 140, where the motor controller 11 is used for driving the motor M. The motor M has a first terminal O1 and a second terminal O2, where the first terminal O1 has a first signal Vo1 and the second terminal O2 has a second signal Vo2. The motor controller 11 comprises a switch circuit 150, a control circuit 160, and a phase signal generating circuit 170. The switch circuit 150 includes a first transistor 151, a second transistor 152, a third transistor 153, and a fourth transistor 154 for supplying a motor current to the motor M. The first transistor 151 is coupled to a voltage source VCC and the first terminal O1 while the second transistor 152 is coupled to the first terminal O1 and a third terminal GND. The third transistor 153 is coupled to the voltage source VCC and the second terminal O2 while the fourth transistor 154 is coupled to the second terminal O2 and the third terminal GND. Each of the first transistor 151, the second transistor 152, the third transistor 153, and the fourth transistor 154 may be respectively a p-type MOSFET or an n-type MOSFET. As shown in FIG. 2, each of the first transistor 151 and the third transistor 153 may be a p-type MOSFET, while each of the second transistor 152 and the fourth transistor 154 may be an n-type MOSFET.

The control circuit 160 generates a first control signal C1, a second control signal C2, a third control signal C3, and a fourth control signal C4 so as to respectively control the ON/OFF states of the first transistor 151, the second transistor 152, the third transistor 153, and the fourth transistor 154. The Hall sensor 140 detects a position of the rotor 100 and generates a first voltage signal V1 and a second voltage signal V2. The comparator 180 may generate an input phase signal Vpi to the phase signal generating circuit 170 based on the first voltage signal V1 and the second voltage signal V2. The phase signal generating circuit 170 receives the input phase signal Vpi, so as to generate an output phase signal Vpo to the control circuit 160. The control circuit 160 may switch motor phases according to the output phase signal Vpo. In other words, the motor controller 11 may drive the motor M based on the output phase signal Vpo.

Figure 3:
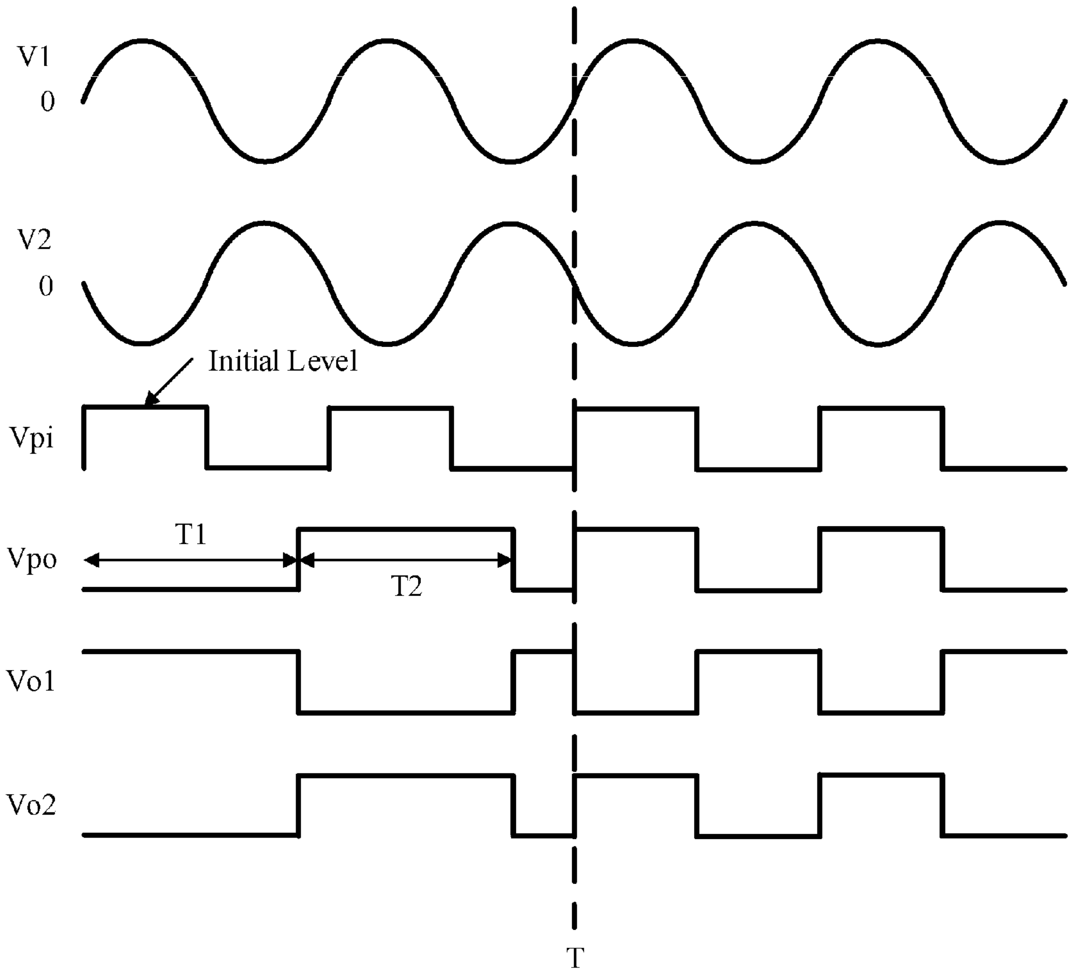
FIG. 3 is a timing chart according to a first embodiment and a second embodiment of the present invention.

FIG. 3 is a timing chart according to a first embodiment and a second embodiment of the present invention. According to the first embodiment of the present invention, the control circuit 160 may firstly store an initial level of the input phase signal Vpi. As shown in FIG. 3, the initial level is a high level. Then the control circuit 160 may enable the output phase signal Vpo to maintain an inverted level of the initial level to drive the motor M during a first time duration T1, such that the rotor 100 may escape from a dead zone. That is, the control circuit 160 may drive the motor M based on an inverted direction of a stored phase. Then the control circuit 160 may enable the output phase signal Vpo to maintain a same level of the initial level to drive the motor M during a second time duration T2, such that the rotor 100 may escape from the dead zone. That is, the control circuit 160 may drive the motor M based on a same direction of the stored phase, where the first time duration T1 may be adjacent to the second time duration T2. In addition, the control circuit 160 may enable the output phase signal Vpo to be asynchronous to the input phase signal Vpi during the first time duration T1 and the second time duration T2. It is noted that among these two driving actions, the control circuit 160 may not refer to a transition time point between a high level and a low level of the input phase signal Vpi to drive the motor M. Therefore, these two driving actions may be regarded as an alignment procedure, such that the rotor 100 may have a rotation angle large enough for escaping from the dead zone successfully. Then after a time point T, the control circuit 160 may enable a waveform of the output phase signal Vpo to be synchronous and the same to a waveform of the input phase signal Vpi, such that the motor M may rotate successfully. Moreover, a waveform of the first signal Vo1 may be synchronous and inverted to a waveform of the output phase signal Vpo. A waveform of the second signal Vo2 may be synchronous and the same to a waveform of the output phase signal Vpo.

According to the second embodiment of the present invention, the control circuit 160 may not store the initial level. Thus, it is not a must-be feature of the present invention to store the initial level of the of the input phase signal Vpi. The control circuit 160 may firstly enable the output phase signal Vpo to maintain a low level to drive the motor M during the first time duration T1, such that the rotor 100 may escape from a dead zone. Then the control circuit 160 may enable the output phase signal Vpo to maintain a high level to drive the motor M during the second time duration T2, such that the rotor 100 may escape from the dead zone, where the first time duration T1 may be adjacent to the second time duration T2. In addition, the control circuit 160 may enable the output phase signal Vpo to be asynchronous to the input phase signal Vpi during the first time duration T1 and the second time duration T2. It is noted that among these two driving actions, the control circuit 160 may not refer to a transition time point between a high level and a low level of the input phase signal Vpi to drive the motor M. Therefore, these two driving actions may be regarded as an alignment procedure, such that the rotor 100 may have a rotation angle large enough for escaping from the dead zone successfully. Then after the time point T, the control circuit 160 may enable a waveform of the output phase signal Vpo to be synchronous and the same to a waveform of the input phase signal Vpi, such that the motor M may rotate successfully. Moreover, a waveform of the first signal Vo1 may be synchronous and inverted to a waveform of the output phase signal Vpo. A waveform of the second signal Vo2 may be synchronous and the same to a waveform of the output phase signal Vpo.

Figure 4:
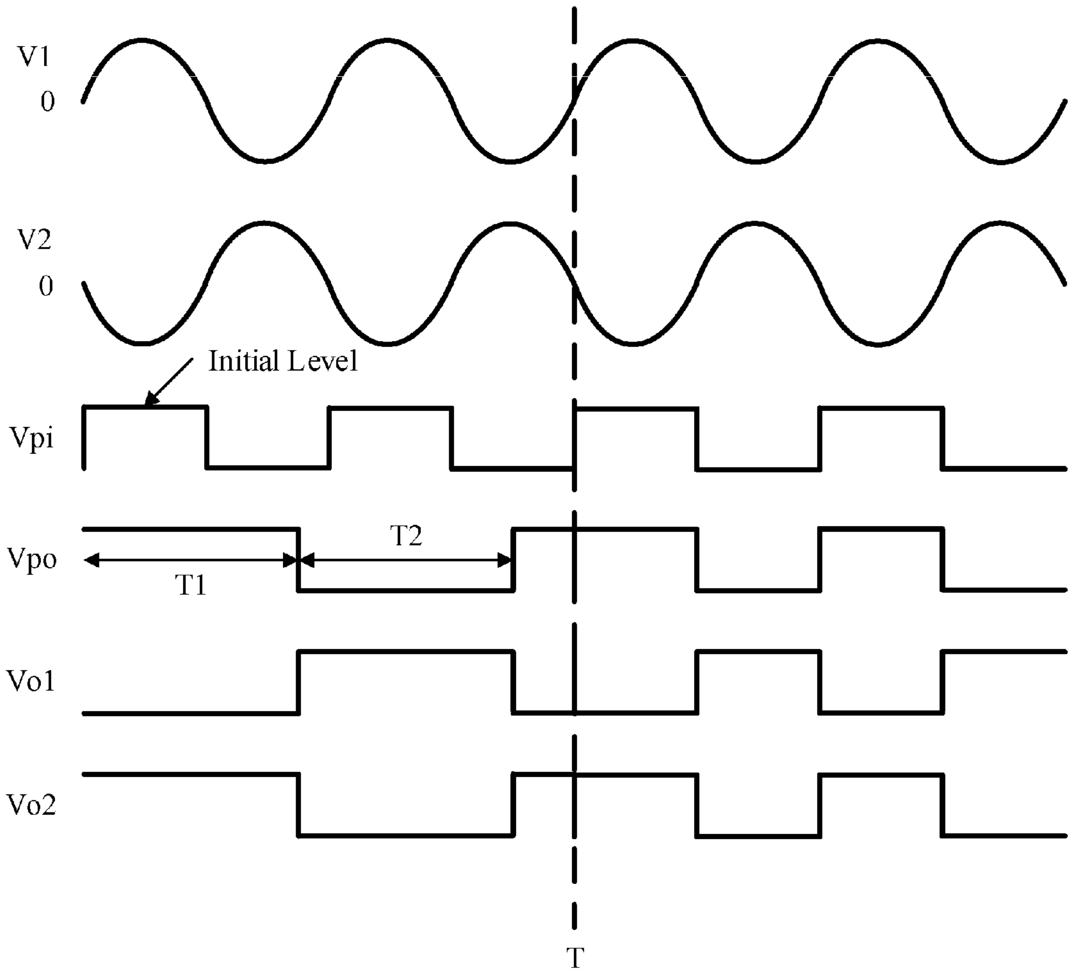
FIG. 4 is a timing chart according to a third embodiment and a fourth embodiment of the present invention.

FIG. 4 is a timing chart according to a third embodiment and a fourth embodiment of the present invention. According to the third embodiment of the present invention, the control circuit 160 may firstly store an initial level of the input phase signal Vpi. As shown in FIG. 4, the initial level is a high level. Then the control circuit 160 may enable the output phase signal Vpo to maintain a same level of the initial level to drive the motor M during a first time duration T1, such that the rotor 100 may escape from a dead zone. That is, the control circuit 160 may drive the motor M based on a same direction of a stored phase. Then the control circuit 160 may enable the output phase signal Vpo to maintain an inverted level of the initial level to drive the motor M during a second time duration T2, such that the rotor 100 may escape from the dead zone. That is, the control circuit 160 may drive the motor M based on an inverted direction of the stored phase, where the first time duration T1 may be adjacent to the second time duration T2. In addition, the control circuit 160 may enable the output phase signal Vpo to be asynchronous to the input phase signal Vpi during the first time duration T1 and the second time duration T2. It is noted that among these two driving actions, the control circuit 160 may not refer to a transition time point between a high level and a low level of the input phase signal Vpi to drive the motor M. Therefore, these two driving actions may be regarded as an alignment procedure, such that the rotor 100 may have a rotation angle large enough for escaping from the dead zone successfully. Then after a time point T, the control circuit 160 may enable a waveform of the output phase signal Vpo to be synchronous and the same to a waveform of the input phase signal Vpi, such that the motor M may rotate successfully. Moreover, a waveform of the first signal Vo1 may be synchronous and inverted to a waveform of the output phase signal Vpo. A waveform of the second signal Vo2 may be synchronous and the same to a waveform of the output phase signal Vpo.

According to the fourth embodiment of the present invention, the control circuit 160 may not store the initial level. Thus, it is not a must-be feature of the present invention to store the initial level of the of the input phase signal Vpi. The control circuit 160 may firstly enable the output phase signal Vpo to maintain a high level to drive the motor M during the first time duration T1, such that the rotor 100 may escape from a dead zone. Then the control circuit 160 may enable the output phase signal Vpo to maintain a low level to drive the motor M during the second time duration T2, such that the rotor 100 may escape from the dead zone, where the first time duration T1 may be adjacent to the second time duration T2. In addition, the control circuit 160 may enable the output phase signal Vpo to be asynchronous to the input phase signal Vpi during the first time duration T1 and the second time duration T2. It is noted that among these two driving actions, the control circuit 160 may not refer to a transition time point between a high level and a low level of the input phase signal Vpi to drive the motor M. Therefore, these two driving actions may be regarded as an alignment procedure, such that the rotor 100 may have a rotation angle large enough for escaping from the dead zone successfully. Then after the time point T, the control circuit 160 may enable a waveform of the output phase signal Vpo to be synchronous and the same to a waveform of the input phase signal Vpi, such that the motor M may rotate successfully. Moreover, a waveform of the first signal Vo1 may be synchronous and inverted to a waveform of the output phase signal Vpo. A waveform of the second signal Vo2 may be synchronous and the same to a waveform of the output phase signal Vpo.

The first time duration T1 and the second time duration T2 may be a first predetermined value and a second predetermined value, respectively. By means of continuous experiments and trials on various motor loads and fan combinations, the first time duration T1 may be greater than 0.0001 seconds and less than 10 seconds and the second time duration T2 may be greater than 0.0001 seconds and less than 10 seconds. According to a preferred embodiment, the first time duration T1 may be greater than 0.001 seconds and less than 1 second and the second time duration T2 may be greater than 0.001 seconds and less than 1 second. Furthermore, the first time duration T1 and the second time duration T2 may be a first adjustable value and a second adjustable value, respectively. The motor controller 11 may further comprise a voltage dividing circuit and a register, where the voltage dividing circuit comprises two or more resistors. The user may adjust the first time duration T1 or the second time duration T2 based on the voltage dividing circuit. Also, the user may adjust the first time duration T1 or the second time duration T2 based on the register. Both the first time duration T1 and the second time duration T2 may be related to a motor load. When the motor load is heavier, the first time duration T1 and the second time duration T2 increase. When the motor load is lighter, the first time duration T1 and the second time duration T2 decrease.

More specifically, by enabling the rotor 100 to at least escape from the dead zone twice or more, the above four embodiments may enable the motor unit 10 and the motor controller 11 to operate in a start-up mode, where the start-up mode may be a forced start-up mode. Similarly, by enabling the rotor 100 to at least escape from the dead zone twice or more, the above four embodiments may enable the motor unit 10 and the motor controller 11 to execute a forward and reverse rotation function. In other words, based on the present invention, the motor unit 10 and the motor controller 11 may enable the rotor 100 to at least escape from the dead zone twice or more, thereby overcoming a dead zone lockup issue. To conclude, the above four embodiments may have the following features in common: The control circuit 160 may firstly enable the output phase signal Vpo to maintain a first digital level to drive the motor M during the first time duration T1, such that the rotor 100 may escape from a dead zone. Then the control circuit 160 may enable the output phase signal Vpo to maintain a second digital level to drive the motor M during the second time duration T2, such that the rotor 100 may escape from the dead zone, where the first time duration T1 may be adjacent to the second time duration T2. The first digital level may be different from the second digital level. The control circuit 160 may enable the output phase signal Vpo to be asynchronous to the input phase signal Vpi during the first time duration T1 and the second time duration T2. Then after the time point T, the control circuit 160 may enable a waveform of the output phase signal Vpo to be synchronous and the same to a waveform of the input phase signal Vpi, such that the motor M may rotate successfully. That is, before the time point T, the control circuit 160 may enable a waveform of the output phase signal Vpo to be asynchronous to a waveform of the input phase signal Vpi.

According to the above four embodiments, when the motor unit 10 installs a symmetrical silicon steel plate 110, the motor unit 10 and the motor controller 11 may enable the motor M to switch phases smoothly and reduce noise in a steady rotation state, thereby overcoming the prior-art issue. In other words, the motor controller 11 may be applied to a symmetrical silicon steel plate mechanism. In addition, when the motor unit 10 installs the symmetrical silicon steel plate 110, the fan maker may utilize the silicon steel plate 110 to be applied to a stator mechanism of a three-phase motor, thereby saving the cost.

While the present invention has been described by the preferred embodiments, it is to be understood that the invention is not limited to the disclosed embodiments. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller used for driving a motor, and the motor controller comprising:

a switch circuit, configured to supply a motor current to the motor;

a control circuit, configured to generate a plurality of control signals to control the switch circuit; and a phase signal generating circuit, configured to receive an input phase signal for generating an output phase signal to the control circuit, wherein the control circuit switches motor phases according to the output phase signal, the control circuit firstly enables the output phase signal to maintain a first digital level to drive the motor during a first time duration, such that a rotor escapes from a dead zone, then the control circuit enables the output phase signal to maintain a second digital level to drive the motor during a second time duration, such that the rotor escapes from the dead zone, the first digital level is different from the second digital level, and after a time point, the control circuit enables a waveform of the output phase signal to be synchronous and the same to a waveform of the input phase signal.

2. The motor controller of claim 1, wherein before the time point, the control circuit enables a waveform of the output phase signal to be asynchronous to a waveform of the input phase signal.

3. The motor controller of claim 1, wherein the control circuit stores an initial level of the input phase signal, and the first digital level is inverted to the initial level.

4. The motor controller of claim 1, wherein the motor controller enables the rotor to at least escape from the dead zone twice or more to operate in a start-up mode.

5. The motor controller of claim 1, wherein the motor controller enables the rotor to at least escape from the dead zone twice or more to execute a forward and reverse rotation function.

6. The motor controller of claim 1, wherein the control circuit enables the output phase signal to be asynchronous to the input phase signal during the first time duration and the second time duration.

7. The motor controller of claim 1, wherein the motor further comprises a first terminal and a second terminal, the first terminal has a first signal, the second terminal has a second signal, and a waveform of the first signal is synchronous and inverted to a waveform of the output phase signal.

8. The motor controller of claim 7, wherein a waveform of the second signal is synchronous and the same to a waveform of the output phase signal.

9. The motor controller of claim 1, wherein the first time duration is a first predetermined value, and the second time duration is a second predetermined value.

10. The motor controller of claim 1, wherein the motor controller enables the motor to switch phases smoothly in a steady rotation state.

11. The motor controller of claim 1, wherein the motor controller enables the motor to reduce noise in a steady rotation state.

12. The motor controller of claim 1, wherein the motor is a single-phase motor.

13. The motor controller of claim 1, wherein the motor controller is applied to a symmetrical silicon steel plate mechanism.

* * * * *